Nov. 7, 1944.   W. F. LAWRY, JR   2,362,381
AIRCRAFT COWLING CONSTRUCTION
Filed Oct. 20, 1942
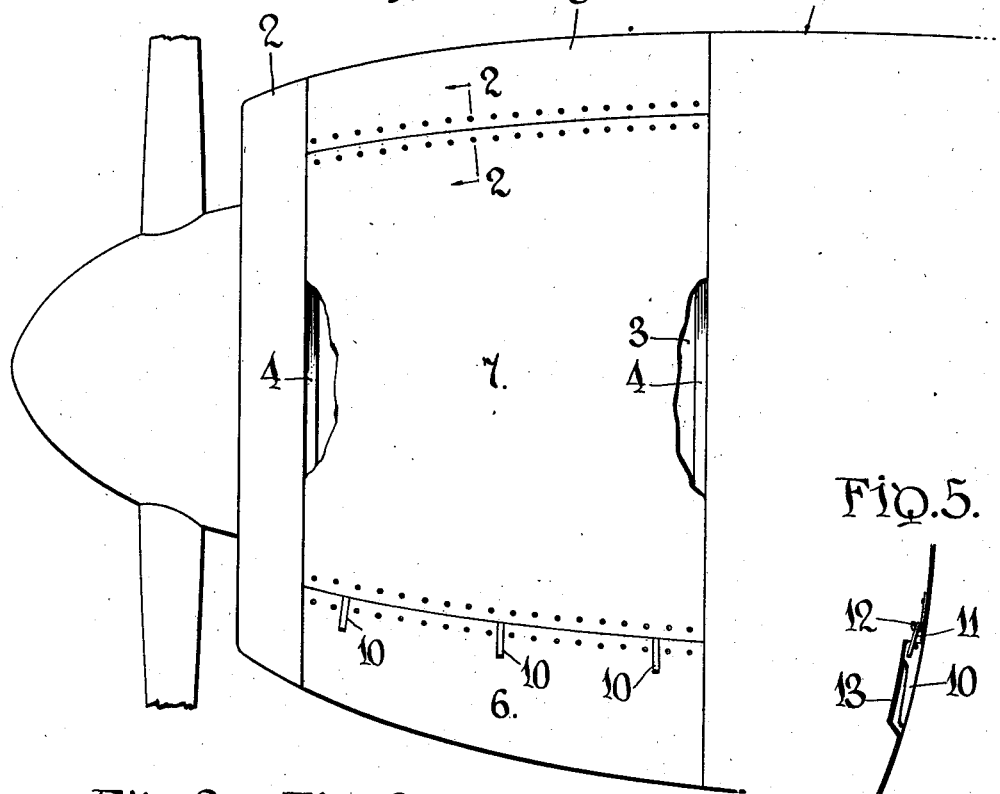
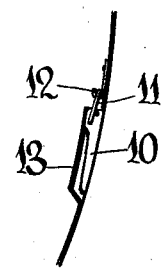
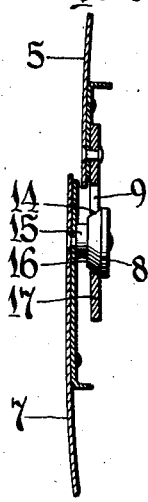
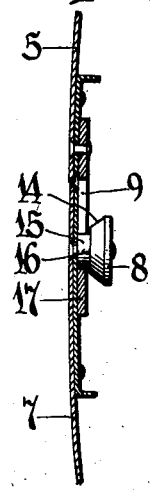
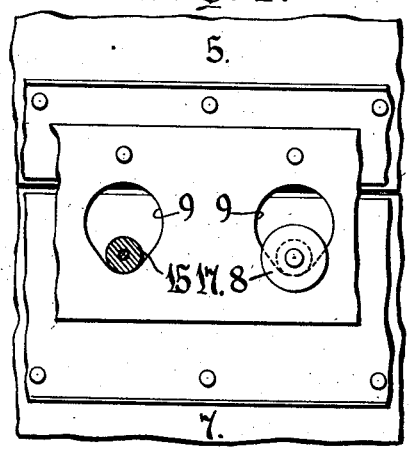
INVENTOR
WILLIAM F. LAWRY, JR
BY
Bean, Brooks, Buckley & Bean
ATTORNEYS Patented Nov. 7, 1944

2,362,381

UNITED STATES PATENT OFFICE 2,362,381

AIRCRAFT COWLING CONSTRUCTION

William F. Lawry, Jr., Elkins Park, Pa., assignor to Brewster Aeronautical Corporation, Johnsville, Pa.

Application October 20, 1942, Serial No. 462,718

9 Claims. (Cl. 244—130)

This invention relates to an aircraft cowling designed for enclosing the engine thereof within the fore part of the fuselage or other body portion of the airplane.

Heretofore it has been the practice to provide a hinged door or cowl portion which was lifted to open the engine compartment for engine inspection and repair. Access to the engine compartment was restricted and engine inspection and adjustment made difficult because of the crowded and cramped quarters within the fixed body portion of the cowling.

The primary object of the present invention is to provide a cowling structure for the aircraft engine which will increase the accessibility of the engine to the aircraft mechanic without detracting from the efficiency of the airplane in flight.

The invention further has for its object to provide a sectional encircling cowling which is demountable as a whole for opening the entire engine compartment to inspection from all sides but will nevertheless seat firmly upon and snugly embrace the fuselage in a manner to maintain the streamlined design and the airflow surface of the body for greatest efficiency.

In the drawing:

Fig. 1 is a fragmentary side elevation of an airplane depicting the improved cowling construction, portions of the latter being broken away;

Fig. 2 is a fragmentary cross sectional view taken about on line 2—2 of Fig. 1 through one of the cowl joints and showing the parts in the process of being assembled;

Fig. 3 is a view similar to Fig. 2 but showing the parts in their fully engaged position;

Fig. 4 is a fragmentary inside elevation of the united parts of Fig. 3, a portion of one of the fasteners being in section; and Fig. 5 is a detailed view of one of the cowl clamps.

Referring more particularly to the drawing, the numeral 1 designates the forward portion of the fuselage which may have a nose portion 2 spaced forwardly therefrom. An engine compartment 3, open on all sides, is provided with annular shoulders or seats 4 which completely encircle the engine compartment and are inset slightly from the outer skin or surface of the aircraft body portion to provide support for the sectional cowling.

The cowling is composed of multiple sections detachably interlocked so that it may readily be dismantled in its entirety to give free access to the entire engine compartment. The number of sections will vary with the diameter of the cowling, the present disclosure showing a top section 5, bottom section 6 and a side section 7, which latter will be duplicated on the opposite side of the fuselage thereby providing a cowling composed of four sections which have their side margins seating on the inset shoulders 4. These sections are interconnected by detachable fasteners in the form of headed studs or buttons 8, located on an edge of one section, fitting in recesses or apertures 9 formed in the abutting edge of an adjacent section. The flexible cowling is preferably secured in position by quickly detachable clamps each of which may consist of a toggle lever 10 pivoted on one end of the cowling and connected by an overcenter link 11 to a hook 12 on the opposite end. By folding the levers to their operative position, within surface pockets 13, the endless flexible cowling will be contracted about the fuselage or body portion and down onto the seats 4 to seal the engine compartment closed.

In order to bring the several joints of the cowling within the body lines of the streamlined fuselage, and flush with the outer surface of the latter against projection into the airstream, means are provided to urge the outlying one of abutting edge portions inwardly to its seat. In accordance with the present disclosure such flushing action is accomplished by a camming face portion 14 provided on the fastener stud 8. This camming face is adapted to initially ride on the adjacent edge portion of its engaged aperture 9, as depicted in Fig. 2, whereupon tightening the flexible cowling it will draw the outer one of the abutting edge portions radially inward and not only flush the two edge portions with each other, as illustrated in Fig. 3, but also with the adjoining fuselage body. After this closing of the joint parts the edge of the aperture will rest against the shank 15 where it will remain beneath the overhanging head shoulder 16 by reason of the tension on the cowling. The apertures 9 may be formed in an offset joint strip 17 carried by one section and designed to underlap the companion section from which the headed studs project inwardly.

From the foregoing it will be observed that the operation of the tensioning means or cowl clamps will not only contract the sections toward their seats 4 but will also adjust the abutting edges of the several sections to lie flush with one another and with the adjoining body portion whereby the outer surface of the cowling will be continuous and practically uninterrupted to airflow thereover. The result is that the streamlined body design of the fuselage is maintained free of all projections which might otherwise afford resistance to air slippage over the aircraft surface.

While the foregoing description has been given in detail, it will be understood that the embodiment described is merely illustrative of the inventive principle involved, which latter may be applied to other physical embodiments without departing from the scope and spirit of the invention claimed.

What is claimed is:

1. In an aircraft having a body portion with an engine compartment, a cowling for encircling the body portion for closing such a compartment, said cowling comprising plural sections, the joint between two adjacent sections comprising separable fasteners consisting of headed studs carried by one section engaging in recesses in an overlapping part on the other section, the under side of each head formed with a beveled seat on which the recess defining edge will ride to adjust the edge portions of the two sections relative to each other for bringing their outer surfaces flush, and means acting in tension on such sections for effecting relative movement therebetween whereby the recess defining edge will so ride down each beveled seat to effect such flushing action.

2. In an aircraft having a body portion containing an engine compartment opening thereabout and having annular seats inset from the outer surface of the body portion of the fore and aft sides of the compartment, a cowling supported at its side margins by the seats with the outer surface of the cowling substantially flush with the outer surface of the body portion, said cowling being formed of a plurality of sections, means detachably uniting the sections in series, said uniting means having parts extending transversely of the series for camming the adjacent edges of the sections into firm engagement with each other upon a circumferential tightening of the cowling on its seats, and means acting in tension on the series of sections for effecting such circumferential tightening of the cowling.

3. An engine cowling for aircraft comprising detachably connected sections adapted to be contracted about the engine compartment for closing the same, means detachably connecting the sections comprising a series of fastening studs on one section having under beveled heads and engageable in recesses formed in an overlapping portion of the adjacent section whereby upon contracting the cowling about the engine compartment the walls of the recesses will engage the bevel of the heads to cam the abutting edges into a substantially flush relationship.

4. In an aircraft having a propeller supporting body portion opening about its perimeter into an engine compartment, cowling for encircling the body portion for closing such a compartment, said cowling comprising a series of interconnected sections, the joint between two adjacent sections comprising separable fasteners consisting of headed studs carried on the inner face of one section and engaging in recesses in an underlapping part on the other section, the under side of each head formed with a beveled seat on which the recess defining edge will ride to relatively adjust the meeting edge portions of the two sections flush at their outer surfaces, and each seat terminating in a retaining shoulder beneath which the recess defining edge will engage to so hold the sections flush when the series is under tension, and means acting in tension upon the series to effect such engagement whereby to secure the cowling operative to close the compartment when applied thereto.

5. An aircraft having a body portion with an engine compartment, a cowl encircling the body portion for closing the compartment and comprising a longitudinal series of segmental sections with their edges substantially abutting to bring their outer surfaces flush, parts arranged on the inner face of one section for overlapping and detachably engaging parts on a margin of an adjacent section for connecting the two together, and cowl tensioning means connecting the opposite ends of the series into an annulus and acting in tension to contract the cowl about the body portion to a compartment closing position, said interengaging parts having cooperating portions acting transversely of and in response to the tensioning action of said means for so bringing the outer surfaces of the parts-carrying sections flush.

6. An engine cowling for aircraft comprising a plurality of segmental sections, means interconnecting the sections to form a flexible series adapted to be contracted about the engine compartment for closing the same, said interconnecting means embodying parts coacting radially to adjust the meeting edges of adjacent sections to bring their outer surfaces flush upon the application of a tensioning force to the series, whereby to provide a substantially unbroken exterior airflow surface, and connecting means coupling the opposite ends of the series to form an annular closure for the compartment and acting in tension through the series to effect such coaction of said parts.

7. In an aircraft having a body portion with an engine compartment, a cowling for closing such a compartment, inset seats supporting the cowling so that its outer surface is substantially flush with the outer surface of the body to provide a smooth airflow surface, said cowling comprising plural sections, means connecting the sections to form an annular series and operating under tension to contract the cowling inwardly onto the inset seats to a compartment closing position wherein the outer surfaces of the cowling and the body portion are substantially flush, and means operable by and during such cowling contracting operation to adjust inwardly any projecting one of the meeting edges of adjacent sections to bring the outer surfaces of the sections flush whereby the outer surface of the sectional cowling is substantially unbroken to airflow.

8. In an aircraft having a body portion with an engine compartment, seats inset from the outer surface of the body, a cowling encircling the body portion and engaging the inset seats for closing such compartment, said cowling comprising a series of interconnected segmental sections, the joint between two adjacent sections comprising separable fasteners consisting of headed studs extending inwardly from the inner face of one section and engaging in recesses in an underlapping part on the other section whereby the outer meeting surfaces are free of projections, the under side of each head formed with a beveled seat on which the recess defining edge will ride to draw the outer meeting surfaces of the two sections flush when the series of sections are tensioned, and means acting in tension upon such series.

9. An engine cowling for aircraft comprising a plurality of segmental sections, means detachably connecting the sections to form a flexible series, and coupling means connecting the opposite ends of the series to form an annular closure for the engine compartment, said coupling means acting in tension on the series to contract the closure about the engine compartment, said detachable connecting means embodying parts coacting to radially adjust the meeting edges of adjacent sections to bring their outer surfaces flush by and upon application of a tensioning force to the series by said coupling means.

WILLIAM F. LAWRY, Jr.